July 11, 1961 W. W. LAUDERDALE 2,991,645
MOBILE CALIBRATION UNIT FOR LIQUID METERS
Filed June 10, 1958 2 Sheets-Sheet 1

INVENTOR
Woodrow W. Lauderdale

BY *Cecil L. Wood*

ATTORNEY

July 11, 1961 W. W. LAUDERDALE 2,991,645
MOBILE CALIBRATION UNIT FOR LIQUID METERS
Filed June 10, 1958 2 Sheets-Sheet 2

INVENTOR
Woodrow W. Lauderdale

BY
ATTORNEY

United States Patent Office 2,991,645
Patented July 11, 1961

2,991,645
MOBILE CALIBRATION UNIT FOR LIQUID METERS

Woodrow W. Lauderdale, P.O. Box 244, Bloomfield, N. Mex.
Filed June 10, 1958, Ser. No. 741,712
1 Claim. (Cl. 73—3)

This invention relates to a mobile calibration unit, and it concerns more particularly a compact unit, capable of being mounted on a truck, for use in calibrating or testing comparatively small tanks to determine their volumetric capacity, and for testing liquids meters to determine either their volumetric displacement or their rate of flow.

An object of the invention is to provide a mobile calibration unit which is capable of being used to calibrate liquid meters from the standpoint of volumetric displacement as well at rate of flow, the meter being tested in its normal operating environment and the usual operating liquid being used to calibrate the meter.

Another object of the invention is to provide a mobile calibration unit for the purpose described having a plurality of calibration tanks, of different sizes, whereby the unit is characterized by its flexibility, and is adapted for use in testing meters whose capacity may vary over a wide range.

The invention will be readily understood by referring to the following description and the accompanying drawing, in which.

Figure 1:
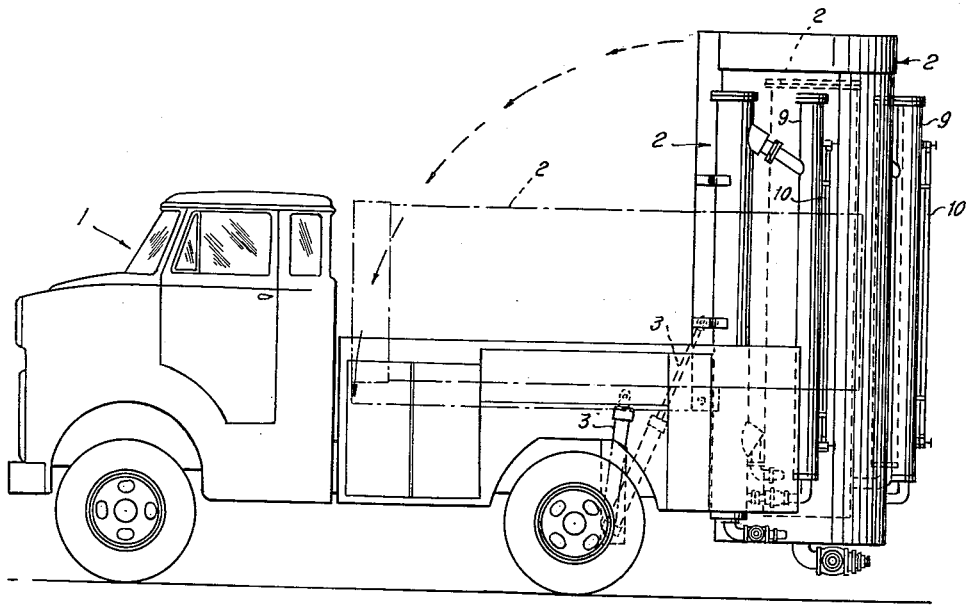
FIG. 1 is a side elevational view of a truck having a calibration unit embodying the invention mounted thereon.

Referring to FIG. 1 of the drawing, a truck is designated generally by the numeral 1. Three calibration tanks embodying the invention, which are of different sizes, and each of which is designated generally by the numeral 2, are pivotally mounted on the truck 1 as a unit, and are capable of being acted on by a hydraulic cylinder 3 whereby they are movable from a horizontal position, shown in dotted lines, for convenience in transportation, to a vertical operating position. The tanks 2 are clustered in relatively close relationship, the smaller tanks being arranged about the larger one.

Figure 3:
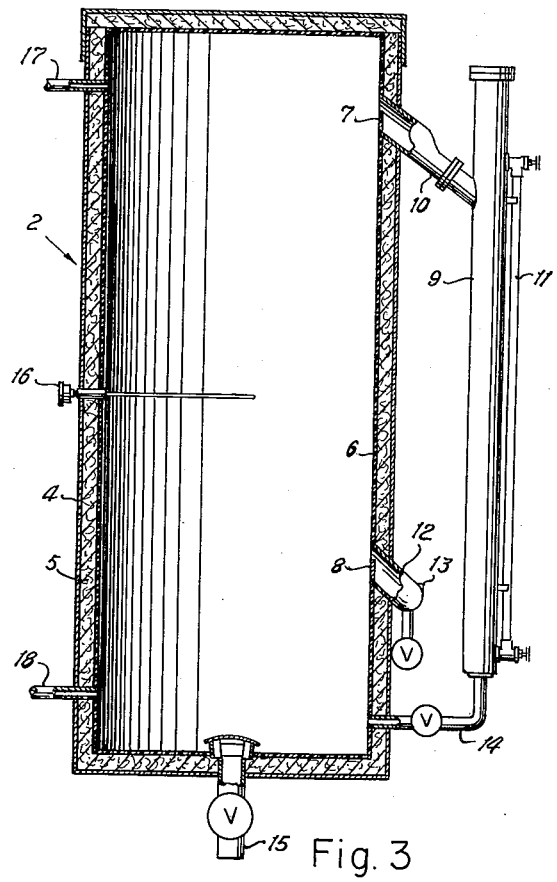
FIG. 3 is an elevational view, partly in section taken on a median line, of one of the calibration tanks shown in FIG. 1.

As shown in FIG. 3, the calibration tanks 2 are advantageously insulated against heat, as by means of rock wool bats 4 and metallic aluminum 5, to thereby reduce the effect of atmospheric temperature on the results of the tests. The tanks 2 preferably are lined with plastic material 6, to thereby reduce the effect of deterioration of the tanks 2, by corrosion and chemical action, on the results of the tests.

A pair of weirs, numbered 7 and 8, are operatively connected to the side wall of each of the calibration tanks 2, at predetermined points spaced from the top and bottom thereof, respectively. The weirs 7 and 8 comprise overflow connections. The portion of the tank 2 below the top weir 7 and above the bottom weir 8 is calibrated.

A vertically disposed pipe 9 is arranged parallel to each of the calibration tanks 2, and is connected by an overflow pipe 10 to the top weir 7. A sight glass 11 is operatively connected to the pipe 9. The pipe 9 is calibrated whereby the volume of liquid collecting therein may be determined by visual inspection.

A valved outlet is connected by an overflow pipe 12 to the bottom weir 8. A liquid level indicator 13 is provided in the overflow pipe 12.

A valved connection 14 is provided between the lower end of the pipe 9 and the calibration tank 2, whereby the pipe 9 may be drained to the tank 2.

Each of the calibration tanks 2 has a valved connection 15 in its lower end whereby liquid may be pumped in and out of the tank 2 through a meter (not shown) to be tested by the invention.

The calibration tanks 2 each have a connection intermediate its ends, as at 16, for a temperature sensitive instrument. The tanks 2 also have connections at 17 and 18, above and below the top and bottom weirs 7 and 8, for a pressure sensitive instrument as hereinafter described.

Figure 4:
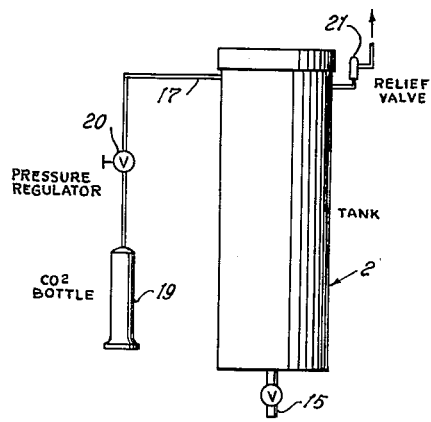
FIG. 4 is a diagrammatic elevational view of a portion of the apparatus, for use in maintaining a desired operating pressure on the down stream side of a meter being tested.

As shown in FIG. 4, before testing a meter, the calibration tank 2 is pressurized with carbon dioxide, introduced into the tank 2 from the supply tank or bottle 19 thru the pressure connection 17 and a pressure regulator 20, whereby a predetermined pressure is produced therein. As liquid is pumped through the meter to be tested into the tank 2, thru the valved connection 15, a constant pressure is maintained in the tank 2 by release of carbon dioxide thru a pressure relief valve 21. One or more of the bottles 19 may be carried with the assembly on the truck 1.

Figure 2:
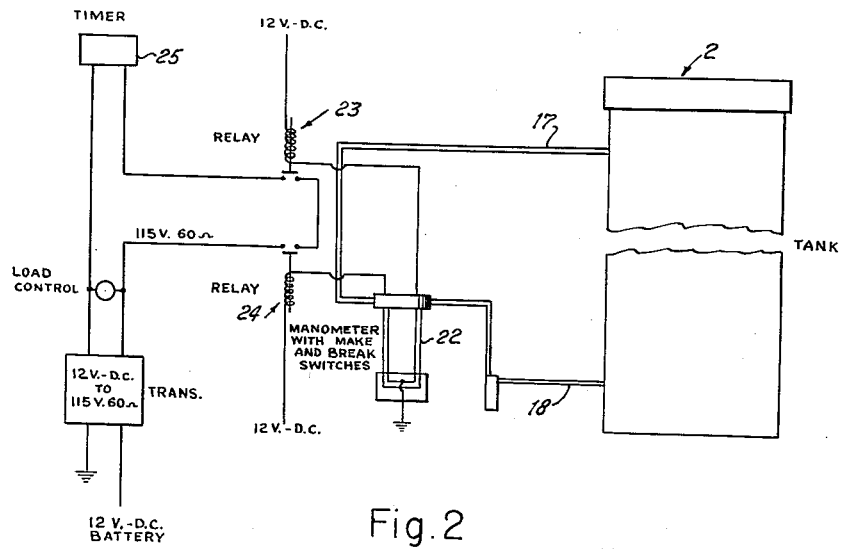
FIG. 2 is a diagrammatic elevational view of a portion of the apparatus, for use in calibrating a rate of flow meter, showing an electrical circuit having a timer element connected therein for indicating rate of flow through a flow meter.

As shown in FIG. 2, in testing a rate of flow meter, the calibration tank 2 is first pressurized with carbon dioxide, as above described, and the pressure leads 17 and 18 are connected to opposite sides of a manometer 22. The manometer 22 includes make and break switches whereby relays 23 and 24 are operable in response to variations in the liquid level within the tank 2, as reflected by pressure differences between the surface pressure existing at the top of the tank 2, as at 17, and the sum of the surface pressure and the static pressure existing at the bottom of the tank 2, which is connected to the conduit 15, as at 18.

The time required for the liquid level within the tank 2 to increase from one predetermined level to another, as determined by the relays 23 and 24, is measured by an electrical timer 25, which may be of any suitable construction. The rate of flow of the meter being tested is a function of the timer 25.

The invention may be modified in various ways without departing from the spirit and scope thereof.

What is claimed is:

Apparatus for testing the rate of flow of liquid meters comprising an elongated, normally vertically disposed tank having a valved bottom inlet for connecting thereto a flow meter to be tested, and having means for determining by visual inspection the liquid level within the tank, a valved inlet communicating with the upper end of the tank, controlled by a pressure regulator, for supplying an inert gas to the tank under a predetermined pressure, a pressure relief valve communicating with the upper end of the tank, a pair of fluid conduits communicating with the tank near its upper and lower ends, respectively, a manometer having its opposite sides connected to the respective fluid conduits, a pair of make and break switches on opposite sides of the manometer responsive to the flow of fluid therein, and a timing device actuated by relay means responsive to the opening and closing of the switches.

(References on following page)

References Cited in the file of this patent

UNITED STATES PATENTS

| | | |
|---|---|---|
| 2,423,397 | Lavigne | July 1, 1947 |
| 2,465,899 | Maxon | Mar. 29, 1949 |
| 2,772,561 | Plank et al. | Dec. 4, 1956 |
| 2,792,705 | Barrett | May 21, 1957 |

OTHER REFERENCES

Publications: Oil and Gas Journal, Oct. 1, 1956, pages 87–92, "P.D. Meters Get the Job Done," by McKinley. (Copy in 73–3.)

Publication: Instrumentation, 1st quarter 1953, pages 27–29, "Metering Gas Flow," by Westmoreland. (Copy in 73–3.)